(12) United States Patent
Norp et al.

(10) Patent No.: US 9,178,822 B2
(45) Date of Patent: Nov. 3, 2015

(54) CONGESTION CONTROL IN A TELECOMMUNICATIONS NETWORK

(75) Inventors: Antonius Norp, Nootdorp (NL); Annemieke Kips, Leiden (NL); Johannes Maria van Loon, Zoetermeer (NL)

(73) Assignees: Koninklijke KPN N.V., The Hague (NL); Nederlandse Organisatie voor Togepast-Natuurwetenschappelijk Onderzoek, TNO, Delft (NL)

( * ) Notice: Subject to any disclaimer, the term of this patent is extended or adjusted under 35 U.S.C. 154(b) by 297 days.

(21) Appl. No.: 13/383,557

(22) PCT Filed: Jul. 13, 2010

(86) PCT No.: PCT/EP2010/060054
§ 371 (c)(1),
(2), (4) Date: Feb. 27, 2012

(87) PCT Pub. No.: WO2011/006889
PCT Pub. Date: Jan. 20, 2011

(65) Prior Publication Data
US 2012/0140632 A1  Jun. 7, 2012

(30) Foreign Application Priority Data
Jul. 17, 2009  (EP) .................................... 09009326

(51) Int. Cl.
*H04L 12/801* (2013.01)
*H04W 28/02* (2009.01)
*H04W 28/08* (2009.01)
*H04W 84/00* (2009.01)
*H04L 29/08* (2006.01)
*H04W 4/08* (2009.01)
*H04W 4/00* (2009.01)

(52) U.S. Cl.
CPC ................ *H04L 47/10* (2013.01); *H04L 47/12* (2013.01); *H04L 47/14* (2013.01); *H04L 67/1002* (2013.01); *H04W 4/005* (2013.01); *H04W 28/0252* (2013.01); *H04W 28/08* (2013.01); *H04W 4/08* (2013.01)

(58) Field of Classification Search
CPC .......... H04B 3/54; H04B 14/04; G10L 19/02; H04L 1/0003; H04L 1/0009; H04L 1/0041; H04L 1/0071; H04L 5/0007; H04L 12/5602; H04L 12/5693; H04L 25/49; H04L 25/4902; H04L 25/4927; H04L 27/0008; H04L 29/06; H04L 29/0604; H04L 29/0653; H04L 29/0809; H04L 29/06027; H04L 29/06095; H04L 29/06115; H04L 29/06537; H04L 29/08072; H04L 29/08117; H04L 29/08576; H04L 47/10; H04L 47/11; H04L 47/12; H04L 47/27; H04L 47/30; H04L 47/32; H04L 47/2441; H04L 63/08; H04L 63/102; H04L 2012/5632; H04L 2012/5636; H04L 1/1621; H04L 47/18; H04L 47/127; H04L 12/569; H04L 12/2692; H04L 12/26; H04L 25/0262; H04L 5/0064; H04L 5/0046; H03M 1/00; H03M 2201/196; H03M 2201/4233; H04N 7/50; H04N 7/26079; H04N 7/26085; H04N 7/26244; H04N 7/26271; H04Q 11/0478; G06Q 30/02; H04W 28/06
USPC ................ 370/229, 231, 232, 235, 237, 477; 709/219, 228, 229, 235; 375/240.03, 375/242, 259, 295
See application file for complete search history.

(56) References Cited

U.S. PATENT DOCUMENTS

| | | | |
|---|---|---|---|
| 6,865,185 B1* | 3/2005 | Patel et al. | 370/412 |
| 2003/0133411 A1* | 7/2003 | Ise et al. | 370/230 |
| 2006/0104275 A1 | 5/2006 | Dohm | |
| 2006/0146704 A1* | 7/2006 | Ozer et al. | 370/229 |
| 2006/0159016 A1* | 7/2006 | Sagfors et al. | 370/230 |
| 2007/0253438 A1 | 11/2007 | Curry et al. | |
| 2007/0280126 A1* | 12/2007 | Liu et al. | 370/252 |
| 2009/0245108 A1* | 10/2009 | Wu et al. | 370/233 |

FOREIGN PATENT DOCUMENTS

| | | |
|---|---|---|
| CN | 101292475 A | 10/2008 |
| JP | 2007-110411 | 4/2007 |
| JP | 2009-010687 | 1/2009 |
| WO | WO 2007/045561 | 4/2007 |

OTHER PUBLICATIONS

"3rd Generation Partnership Project; Technical Specification Group Services and System Aspects; Policy and charging control architecture (Release 9)," 3GPP TS 23.203 V9.0.0 (Mar. 2009) 113 pages.

"3rd Generation Partnership Project; Technical Specification Group Services and Systems Aspects; Network architecture (Release 9)," 3GPP TS 23.002 V.9.0.0 (Jun. 2009) 92 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401 V.9.1.0 (Jun. 2009) 234 pages.

"3rd Generation Partnership Project; Technical Specification Group Services and System Aspects; General Packet Radio Service (GPRS); Service description; Stage 2 (Release 7)," 3GPP TS 23.060 V7.8.0 (Sep. 2008) 216 pages.

"3rd Generation Partnership Project; Technical Specification Group Core Network and Terminals; Technical realization of Cell Broadcast Service (CBS) (Release 9)," 3GPP TS 23.041 V9.0.0 (Jun. 2009) 44 pages.

PCT International Search Report and Written Opinion, PCT International Application No. PCT/EP2010/060054 dated Sep. 7, 2010.

European Search Report, European Patent Application No. 09009326.1 dated Oct. 8, 2009.

Japanese Office Action in Japanese Patent Application No. 2014-059759, mailed Dec. 2, 2014.

Chinese Office Action in Chinese Patent Application No. 201080031194.1, mailed Apr. 1, 2014.

* cited by examiner

*Primary Examiner* — Alpus H Hsu
*Assistant Examiner* — Dharmesh Patel
(74) *Attorney, Agent, or Firm* — McDonnell Boehnen Hulbert & Berghoff LLP

(57) ABSTRACT

The invention relates to a method for congestion control in a telecommunications network. The telecommunications network supports one or more active data sessions between a server and at least a first and second communication terminal by providing at least a first and a second bearer for these terminals. The at least first and second communication terminal are assigned to a group for which a common group identifier is or has been stored. Further, a first individual congestion parameter for the first bearer and a second individual congestion parameter for the second bearer of the first and second communication terminal are or have been stored. A group load indicator is defined for the group of terminals corresponding to the common group identifier. The group load indicator is monitored and compared with a group load condition for the group of the at least first and second communication terminals corresponding to the common group identifier. Congestion is controlled by adjusting at least one of the first individual congestion parameter of the first bearer and the second individual congestion parameter of the second bearer when said group load indicator satisfies the group load condition.

15 Claims, 12 Drawing Sheets

| Individual subscription record |
| --- |
| Individual subscription ID |
| Individual QoS and Charging Policies |
| Other subscription information (e.g. Group subscription ID) |

FIG. 3A

| Group Record |
| --- |
| Group ID |
| Group load condition |
| Congestion parameter adjustment policies |
| Individual subscriptions IDs of terminals/bearers in group |

FIG. 3B

| Individual PCC rule |
|---|
| PCC rule ID |
| Flow detection info |
| QoS and Charging treatment |
| (Further information) |

FIG. 5A

| Group rule |
|---|
| Group rule ID |
| Flow detection info for Group |
| Group load condition |
| - - - - - - - - - - |
| PCC rule IDs for terminals/bearers in group |

FIG. 5B

CONGESTION CONTROL IN A TELECOMMUNICATIONS NETWORK

CROSS REFERENCE TO RELATED APPLICATIONS

The present application is a national stage entry of PCT/EP2010/060054, filed Jul. 13, 2010, and claims priority to EP 09009326.1, filed Jul. 17, 2009. The full disclosures of EP 09009326.1 and PCT/EP2010/060054 are incorporated herein by reference.

FIELD OF THE INVENTION

Generally, the invention relates to a method and telecommunications network configured for controlling congestion in a network. More specifically, the invention relates to congestion control in a network used for machine-to-machine communications.

BACKGROUND OF THE INVENTION

Telecommunications networks that provide wireless access (e.g. GSM, UMTS, WiMax, LTE) have developed tremendously over the past years. In such networks, voice and data services can be provided to terminals having a high mobility, i.e. the communication terminals are not bound to a particular location and are freely movable through the area covered by the network. A gateway node of the telecommunications network enables connection to a further network, for example a network based on IP such as the internet.

The availability of such a telecommunications network connected to the further network has resulted in demands for further services, including services that relate to so-called machine-to-machine (M2M) services. M2M applications typically involve hundreds, thousands or millions of communication modules which each act as a communication terminal to the telecommunication network. An example involves the electronic reading of e.g. 'smart' electricity meters at the homes of a large customer base over the telecommunications network from a server connected to the further network. Other examples include sensors, meters, vending or coffee machines etc. that can be equipped with communication modules that allow reporting status information to a data processing centre over the telecommunications network. Such devices may also be monitored by the server. The data processing centre may e.g. store the data and/or provide a schedule for maintenance people to repair or refill a machine, meter, sensor etc.

A characteristic of some of the M2M applications is that the exchange of data with the server is infrequent, for example once every day or so for a smart electricity meter.

Typically, there exists an agreement between the operator of the telecommunications network and the owner/operator of the server or data processing centre about the communication parameters applicable for bearers of each of the communication terminals. As an example, such communication parameters e.g. relate to the QoS class and to the maximum bit rate that is allowed for a bearer in the telecommunications network used for supporting a data session between a particular communication terminal and the server or data processing centre. As an example, in GPRS or UMTS telecommunications networks the communication parameters are comprised in a PDP Context for the communication terminal. In other networks, e.g. LTE networks or cable networks, the communication parameters are provided in similar contexts.

It is generally known that communication parameters can be controlled using policy and charging control (PCC) architectures. An example of such a PCC architecture is described in 3GPP TS 23.203. Policy control is a known process in communication networks, whereby a policy control entity indicates to a policy enforcement entity e.g. how to control bearer resources of e.g. an IP Connectivity Access Network (IP-CAN) bearer. Such IP-CAN bearers may include bearers in GPRS or UMTS communication networks, EPS bearers in LTE communication networks, DOCSIS service flows in cable communication networks etc. Policy control may be used for controlling QoS characteristics in a telecommunications network.

Even though the traffic generated by each of the communication terminals is within the agreed limits as specified in the communication parameters (e.g. PDP Context) for a bearer, and even though such limits are strictly enforced in case a terminal would, intentionally or unintentionally, violate a limit, congestion may occur. For example, when a large number of electricity meters, each infrequently exchanging data with the server, attempt to exchange data with the server at a same moment, the connection between the telecommunication network and the server in the further network may be overloaded or congestion may occur in other parts of the telecommunications network. Overload may occur in either or both the uplink and downlink direction, i.e. data transmitted from the terminals towards the server or transmitted from the server towards the communication terminals, respectively.

Currently, the operator of the telecommunications network has no means to efficiently prevent such overload and has no suitable means to control congestion when it occurs.

U.S. Pat. No. 6,865,185 discloses a method and system for queuing traffic in a wireless network includes receiving a stream of packets for transmission in the wireless network. Each packet includes a flow identifier and is assigned to one of the plurality of virtual groups based on the flow identifier. The virtual groups include discrete transmission resources. Each packet is queued in an assigned virtual group for transmission in the wireless network.

Clearly, there exists a need in the art for more flexible congestion control methods.

SUMMARY OF THE INVENTION

A method for congestion control in a telecommunications network is disclosed. The telecommunications network supports one or more active data sessions between a server and at least a first and second communication terminal by providing at least a first and a second bearer for these terminals.

The at least first and second communication terminal are assigned to a group for which a common group identifier is or has been stored. Further, a first individual congestion parameter for the first bearer and a second individual congestion parameter for the second bearer of the first and second communication terminal are or have been stored. A group load indicator is defined for the group of terminals corresponding to the common group identifier. The group load indicator is monitored and compared with a group load condition for the group of the at least first and second communication terminals corresponding to the common group identifier. Congestion is controlled by adjusting at least one of the first individual congestion parameter of the first bearer and the second individual congestion parameter of the second bearer when said group load indicator satisfies the group load condition.

The method can be used in one or more (gateway) node(s) of the telecommunications network.

A computer program for performing the method and a carrier containing such a computer program are also disclosed. Portions of the program may be distributed through the telecommunications network to perform distributed functions.

Furthermore, a telecommunications network is disclosed that is configured for enabling data sessions between a server and at least a first and a second communication terminal by providing at least a first and a second bearer. A first storage node of the telecommunications network stores a common group identifier assigned to a group comprising the at least first and second communication terminal. A second storage node, possibly being the same node as the first storage node, stores a first individual congestion parameter for the first bearer and a second congestion parameter for the second bearer for the first and second communication terminals, respectively. A monitoring module is provided that is configured for monitoring in the telecommunications network a group load indicator for the group of the at least first and second communication terminal corresponding to the common group identifier. Also, an analyser is provided that is configured for comparing the group load indicator with a group load condition for the group of the at least first and second communication terminal corresponding to the common group identifier. Finally, the telecommunications network comprises a congestion controller configured for controlling congestion by adjusting at least one of the first individual congestion parameter of the first bearer and the second individual congestion parameter of the second bearer when said group load indicator satisfies the group load condition.

It should be appreciated that the disclosed method and telecommunications network may control congestion occurring in the telecommunications network itself and/or in the further network(s) provided between the telecommunications network and the server.

It should also be appreciated that the monitoring step for monitoring the group load indicator and the comparing step for comparing the monitored group load indicator with the group load condition are not necessarily two individual subsequent steps, but may e.g. be integrated in a single step.

Also, usually a communication terminal uses a single bearer in the telecommunications network for supporting one or more data sessions between the communication terminal and the server. The common group identifier may then relate to the communication terminal, which corresponds one-to-one with the bearer. However, in a case where communication terminals use more than one bearer, group identifiers may be assigned on a per-bearer basis, such that a single communication terminal can be assigned to several groups.

The individual congestion parameters of the bearers of the terminals of the group are congestion-related communication parameters of the contexts (e.g. PDP Contexts) of individual terminals of the group. An example of such a congestion parameter comprises a (maximum) bit rate that is agreed for the bearer. The group load indicator relates to the actually measured load at a particular point in time or during a time interval for the group of terminals. As an example, the group load indicator is a measure of the actual bit rate used by the terminals, which bit rate is monitored in the telecommunications network. The group load condition is a condition that, when satisfies, triggers the adjustment of congestion parameters of the individual bearers of the terminals of the group. As an example, the group load condition comprises a bit rate threshold for the group. When the monitored actual bit rate of the terminals exceed the group bit rate threshold, the agreed congestion parameters for the bearers of (at least one or some of) the individual terminals are adjusted. The adjusted congestion parameters are then enforced and congestion is avoided or reduced.

The detection that the group load condition is satisfied does not necessarily mean that actual congestion has occurred. The group load condition may be defined such that the adjustment of the individual congestion parameters is triggered before a congestion state would occur. As an example, selecting a lower threshold value as a group load condition may prevent congestion rather than only to resolve it with a higher threshold value.

Actions to resolve congestion may comprise other actions than downwardly adjusting the individual maximum bit rates for the individual terminals, including the modifying of QoS attributes of one or more of the terminals. As an alternative, additional capacity can be (temporarily) assigned to the terminals of the group.

The disclosed method and telecommunications network allow, in addition to defining (values of) congestion related parameters for individual communication terminals, to define a group load condition for the communication terminals belonging to the group identified by the common group identifier. By monitoring the group load indicator of the group of terminals, the group load condition allows the operator of the telecommunications network, to anticipate congestion by comparing the group load indicator with the group load condition and to act by adjusting the individual congestion parameters of the terminals in the group and enforce these in order to avoid or to relieve congestion caused by terminals of the group.

As an example, the operator of the telecommunications network may define a group bit rate threshold for a group of communication terminals. When the group bit rate exceeds the group bit rate threshold, the operator of the telecommunications network is able to decrease the agreed bit rates of individual communication terminals in order to relieve the congestion in the telecommunications network.

The embodiment of claim 2 allows congestion control for terminals requesting access to the telecommunications network. A terminal requesting access to the telecommunications network and been assigned to a defined group for which a congestion condition is satisfied will be faced with an adjusted individual congestion parameter for his established bearer in order to avoid or limit congestion that could occur by granting the new terminal access to the network with an unadjusted parameter value.

The embodiment of claim 3 provides the advantage of timing the adjustment of the individual congestion parameters on the basis of the most recent data exchange time.

The embodiment of claim 4 enables retrieval of the common group identifier to which a particular terminal belongs on the basis of individual identifiers of this terminal. As such, the common group identifier remains unknown to the terminal. Examples of individual terminal identifiers include IMSI, a terminal number, an application number etc.

The embodiment of claim 5 defines that bit rate is an important parameter for congestion control.

The embodiment of claim 6 provides flexibility for the owner/operator of the M2M server by enabling assigning of communication terminals to one or more groups and (temporarily) adjusting individual congestion parameters of one or more communication terminals within a group. The owner/operator of the server may flexibly adjust the (value of the) congestion parameters of one or more individual terminals within the group as long as the group congestion condition for aggregated communication terminals is not met.

The embodiment of claim 7 allows assigning of a single communication terminal to multiple groups and to apply different corresponding group load conditions to these groups.

The embodiment of claim 8 allows for a gradual adjustment (e.g. stepwise) of the congestion threshold parameters of individual communication terminals of a particular group.

The terminals for which the congestion parameters will be or have been adjusted, should advantageously be informed (e.g. via a signaling message) of an adjustment of the bearer characteristics, e.g. to reduce the maximum bit rate to the data transmission in the uplink direction, as defined in the embodiment of claim 9. The terminals of the group for which the congestion parameters are not adjusted need not be informed.

When such adjustment information is to be communicated to a considerable number of communication terminals, this may result in considerable signaling traffic in the network. The embodiments of claims 10 and 13 make use of the common group identifier. From the common group identifier, the individual communication terminals of the group for which the message is intended can be derived at a suitable place (lower) in the telecommunications infrastructure.

The embodiment of claim 11, further reducing signaling traffic in the telecommunications network, defines that the information comprising the common group identifier is broadcast in one or more parts of the telecommunications network and is received by the communication terminals belonging to the group. In this embodiment, the communication terminals possess or have been informed of the common group identifier and use this information to retrieve the adjustment information message from the broadcast.

Hereinafter, embodiments of the invention will be described in further detail. It should be appreciated, however, that these embodiments may not be construed as limiting the scope of protection for the present invention.

BRIEF DESCRIPTION OF THE DRAWINGS

In the drawings:

FIGS. 3A and 3B depict an individual subscription record and a group record according to an embodiment of the invention;

FIGS. 5A and 5B depict an individual PCC rule and a group rule according to an embodiment of the invention to be used in a congestion control method performed in the telecommunications network of FIG. 4 in combination with the records of FIGS. 3A and 3B;

DETAILED DESCRIPTION OF THE DRAWINGS

Figure 1:
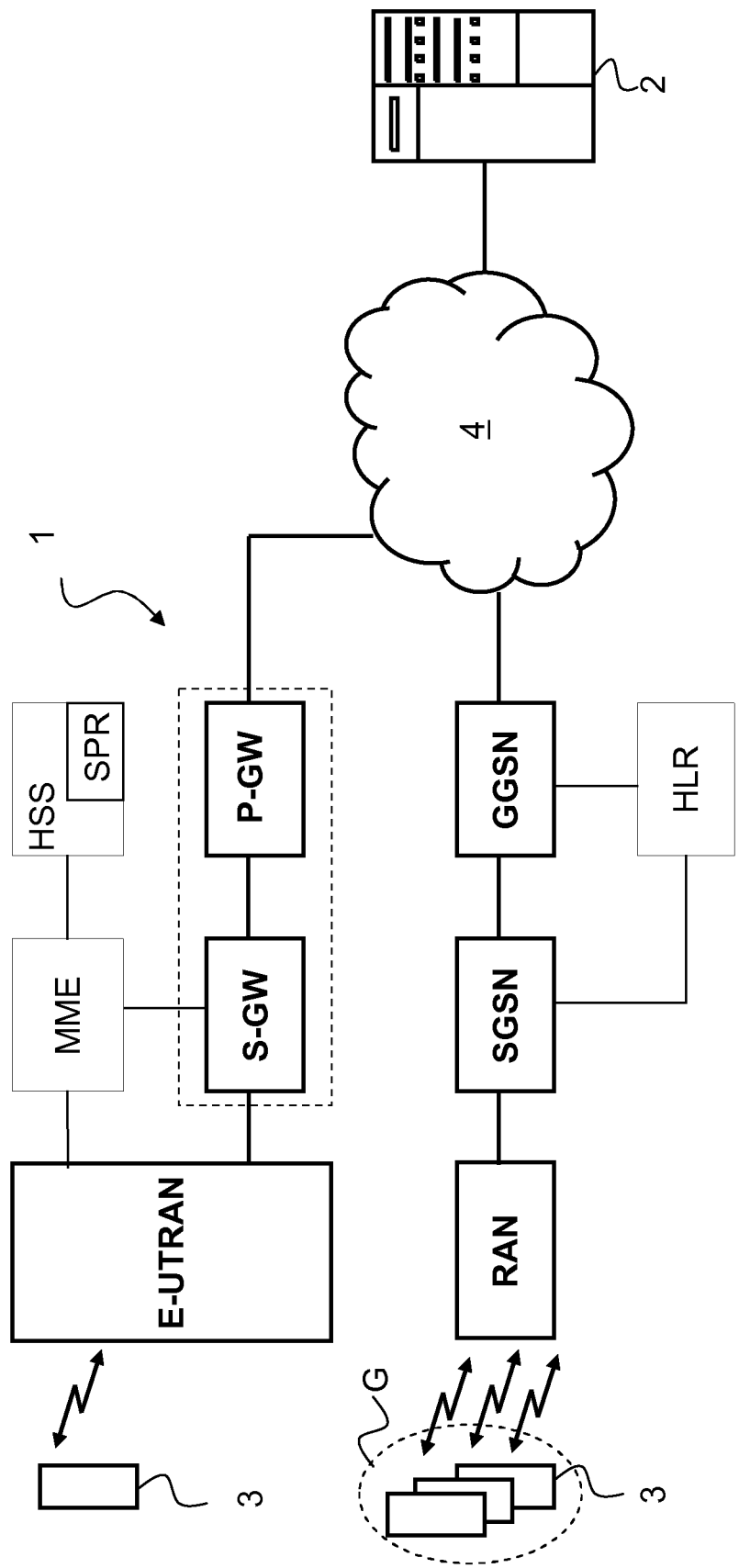
FIG. 1 is a schematic illustration of a prior art telecommunications network connecting communication terminals to a server over a further network.

FIG. 1 shows a schematic illustration of a telecommunications network 1. The telecommunications network 1 allows data sessions between a server 2 and a terminal 3 over a packet data network 4, wherein access of the terminal to the telecommunications network 1 is wireless.

In the telecommunications network of FIG. 1, three generations of telecommunications networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network comprising a Gateway GPRS Support Node (GGSN), a Serving GPRS Support Node (SGSN) and a Radio Access Network (RAN or UTRAN). For a GSM/EDGE radio access network (GERAN), the RAN comprises a Base Station Controller (BSC) connected to a plurality of Base Station Transceivers (BTSs), both not shown. For a UMTS radio access network (UTRAN), the RAN comprises a Radio Network Controller (RNC) connected to a plurality of NodeBs), also not shown. The GGSN and the SGSN are conventionally connected to a Home Location Register (HLR) that contains subscription information of the terminals 3.

The upper branch in FIG. 1 represents a next generation telecommunications network, commonly indicated as Long Term Evolution (LTE) or Evolved Packet System (EPS). Such a network comprises a PDN Gateway (P-GW) and a Serving Gateway (S-GW). The E-UTRAN of the EPS comprises evolved NodeBs (eNodeBs or eNBs) providing wireless access for a terminal 3 that is connected to the S-GW via a packet network. The S-GW is connected to a Home Subscriber Server HSS and a Mobility Management Entity MME for signaling purposes. The HSS includes a subscription profile repository SPR.

Further information of the general architecture of a EPS network can be found in 3GPP TS 23.401.

Of course, architectures other than defined by 3GGP, e.g. WiMAx or cable networks, can also be used within the context of the present invention.

Whereas the invention as defined in the appended claims is generally applicable to such networks, a more detailed description will be provided below for a GPRS/UMTS network.

For such a network, the SGSN typically controls the connection between the telecommunications network 1 and the terminal 3. It should be appreciated that the telecommunications network 1 generally comprises a plurality of SGSNs, wherein each of the SGSNs is connected typically to several BSCs/RNCs to provide a packet service for terminals 3 via several base stations/NodeBs.

The GGSN is connected to the packet data network 4, e.g. the internet, a corporate network or a network of another operator. On the other side, the GGSN is connected to one or more SGSNs.

The GGSN is configured for receiving a data unit for the terminal 3 from the server 2 over the network 4 (downlink) and for transmitting a data unit to the server 2 received from the terminal 3 (uplink).

In an M2M environment, a single server 2 normally is used for communication with a large number of terminals 3. Individual terminals 3 can be identified by individual identifiers, such as an IP address, an IMSI or another terminal identifier.

Figure 2:
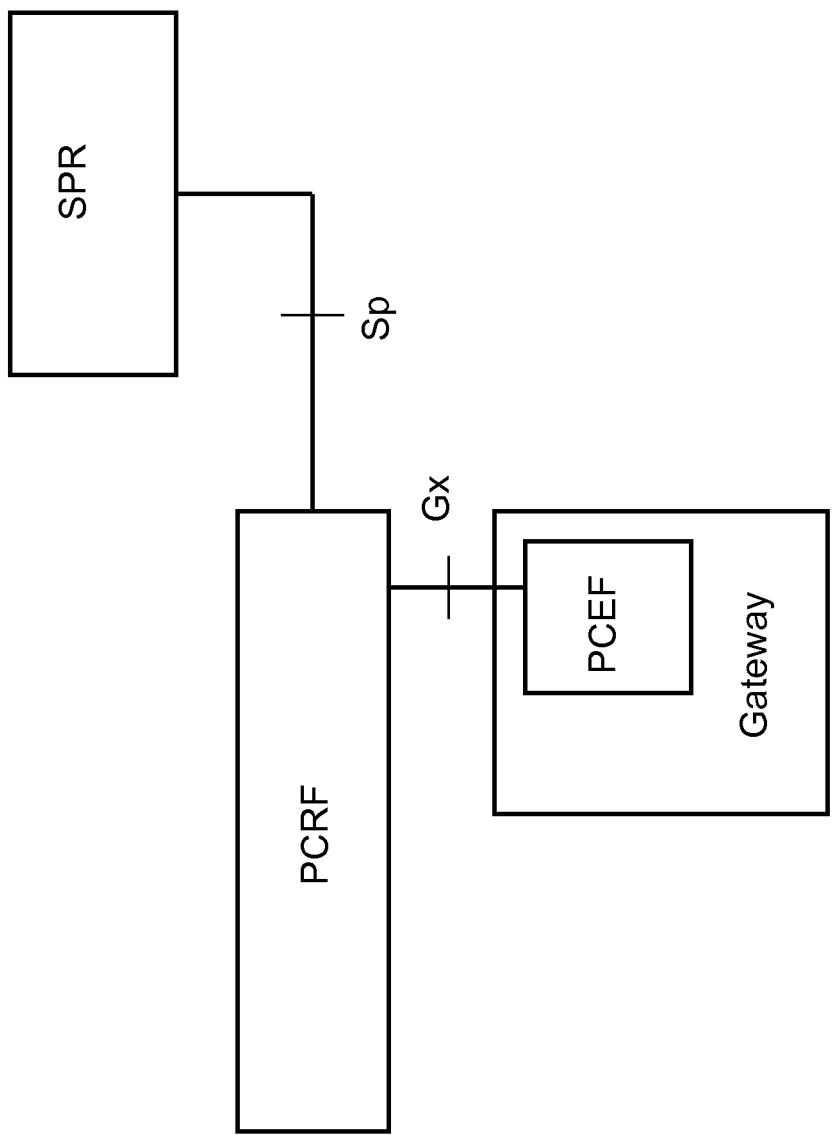
FIG. 2 is a schematic illustration of a prior art policy and charging control (PCC) architecture to be used in the telecommunications network of FIG. 1.

FIG. 2 shows a policy and charging control (PCC) architecture, known from 3GGP TS 23.203 which is included in the present application by reference in its entirety, that can be included in a GPRS, UMTS, LTE or other type of telecommunication network 1.

The central element in the PCC architecture of FIG. 2 is the policy and charging rules function PCRF. The PCRF takes policy decisions related to quality of service (QoS) and charging treatment of service data sessions in an IP Connectivity Access Network (IP-CAN). An IP-CAN is a network capable of supporting IP-CAN bearers over which data sessions may be defined. IP-CAN bearers are IP transmission paths defined by e.g. capacity, delay, bit error rate.

In its decisions, the PCRF takes into account subscription information received from the SPR over the Sp interface and information on the capabilities of the IP-CAN. The PCRF formats its policy decisions in so-called PCC rules. PCC rules are sets of information enabling the detection of a service data flow and providing parameters for policy control and/or charging control. Such a PCC rule contains among others information to detect a service data flow (e.g. the 5-tuple source/destination IP address, source/destination port number, protocol) and information on the required QoS and charging treatment for the service data flow. It also includes a maximum bit rate authorized for the service data flow, separately for uplink and downlink. PCC rules may be predefined or dynamically provisioned at establishment and may then be re-defined during the lifetime of an IP-CAN session.

The PCRF communicates its decisions, formatted as so-called PCC rules, towards the Policy and Charging Enforcement Function (PCEF) over the Gx interface. Furthermore, the PCRF informs the PCEF on network events at whose occurrence it wants to be notified.

The PCEF encompasses service flow detection, policy enforcement and flow based charging functionalities. These functions are performed according to PCC rules either received from the PCRF (dynamic PCC rules) or predefined in the PCEF itself (predefined PCC rules). Furthermore the PCEF informs the PCRF over the Gx interface on network events requiring notification towards the PCRF. The PCEF is located in a Gateway Node (e.g. the GGSN or the P-GW in FIG. 1), that connects the IP-CAN to the external Packet Data Network 4. The network 4, connected to the server 2, can be any network or combination of networks to support the communication between the gateway of telecommunications network 1 and the server 2, for example a dedicated line (copper or fibre-optic cable connecting the gateway to the server 2), a backbone IP network, etc.

The SPR contains all subscription information needed for making subscription-based policy decisions by the PCRF for individual communication terminals 3 based on an individual subscriber identifier, such as IMSI. The subscription information is requested by the PCRF over the Sp interface. The SPR may also notify the PCRF when the subscription information has been changed. The SPR does not necessarily result in a duplication of subscription information in the network. The SPR may for instance contain the HSS or HLR.

As shown in FIG. 1, a group G of terminals 3 can be connected or connectable to the telecommunications network 1 in order to have a data session with the server 2 over the telecommunications network and the packet network 4. In order to identify such a group of terminals 3, in an aspect of the present invention, the HLR and/or SPR may store a common group identifier in relation with a group record in addition to individual subscription records containing the abovementioned subscription information for individual terminals 3.

FIGS. 3A and 3B illustrate an individual subscription record and a group record. The individual subscription record contains subscription information for each terminal 3 individually. The individual subscription record contains for example the individual subscription identifier, the individual QoS and charging policies, which may include a maximum bit rate for the uplink and downlink direction (possibly different for uplink and downlink), a guaranteed bit rate for the uplink and the downlink, other congestion control related information and/or other subscription information.

The group record contains for example the group identifier, information related to the entire group, such as the group load condition, the congestion parameter adjustment policies and a list of identifiers of communication terminals or bearers which belong to the group. The individual subscription records for communication terminals 3 in a group G and the group record are linked via the group identifier and the individual subscription identifiers, i.e. the group record for group G has a common group identifier and a list of identifiers of communication terminals 3 or bearers which belong to the group G. An individual subscription record for a communication terminal in group G may contain also a group identifier of the group G to which the terminal 3 is assigned. The inclusion of the group identifier in the individual subscription records may be advantageous in cases wherein the communication terminals require information on the group G to which they are assigned. An example thereof is provided below, where the common group identifier is included in a broadcast signal. Communication terminals 3 requiring information regarding the group to which they are assigned are then able to retrieve (select) the information from the broadcast signal that is relevant for the group.

It should be appreciated that a single communication terminal 3 can be assigned to more than one group.

There are no particular requirements to the formation of groups. Groups may e.g. (partially) overlap or be disjunct in their group members. Also a hierarchical structure may be used, wherein subgroups within a group G are created (e.g. all terminals served from a specific SGSN/S-GW). Neither is it required that all terminals are included in a group. In the context of congestion control, the formation of groups is expected to be guided by an assessment where congestion may be expected to occur.

The provision of a group record for a group of communication terminals 3 enables various new and inventive methods in the telecommunications network 1. Examples include efficient message transmission to the group of communication terminals 3, access control for the group of communication terminals 3 and flexibility regarding congestion control.

The combination of these examples will now be described in further detail.

Figure 4:
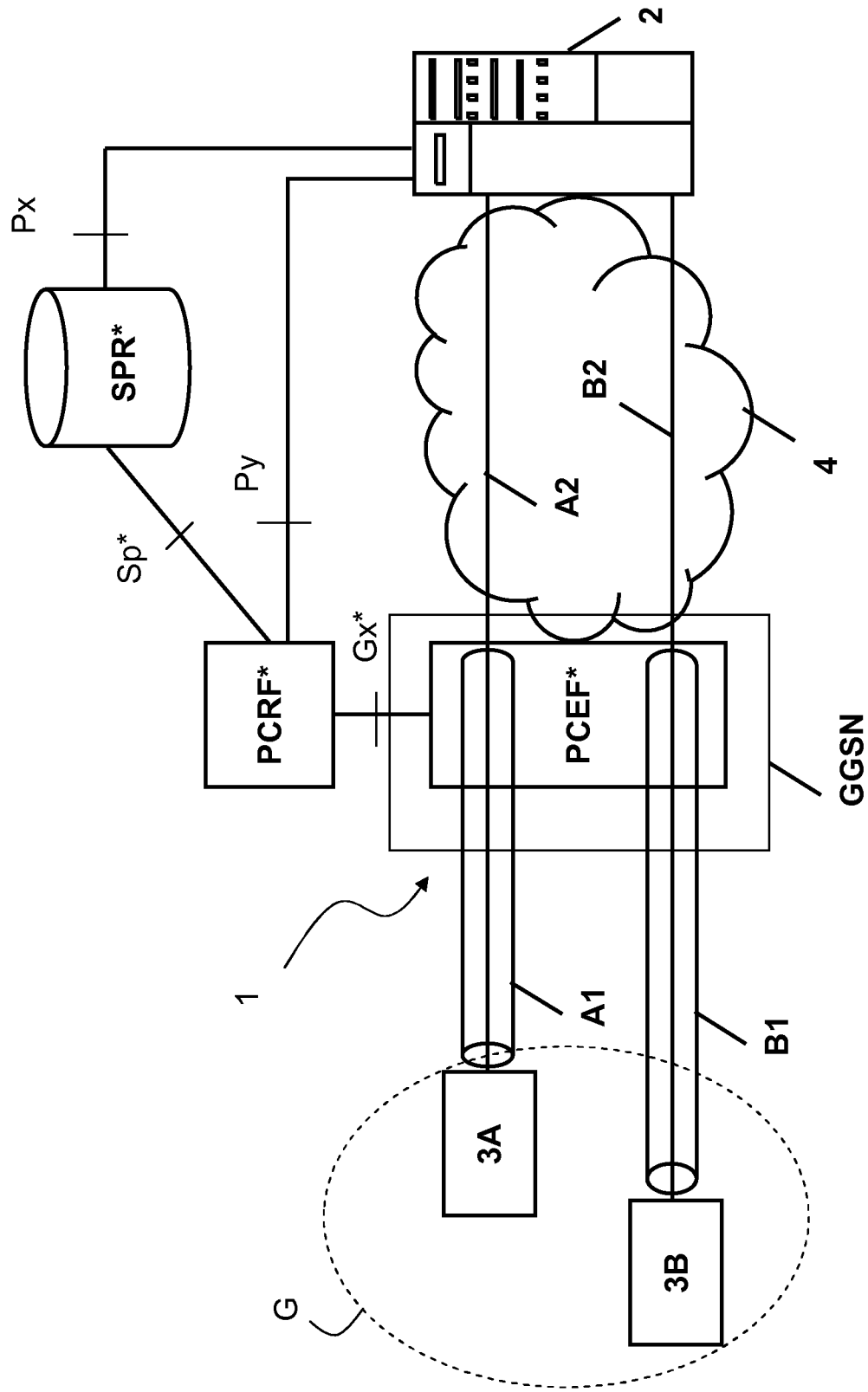
FIG. 4 is a schematic illustration of a telecommunication network according to an embodiment of the invention.

FIG. 4 shows a telecommunications network 1 comprising a PCC* architecture modified with respect to the PCC architecture of FIG. 2 as will be described below in further detail. A first and second communication terminal 3A, 3B, belonging to a group G communicate with a server 2 (e.g. for smart electricity metering in the home to provide the server 2 with metering data).

IP-CAN bearers A1 and B1 (in this case defined by PDP Contexts) are established between terminals 3A, 3B and the gateway (here the GGSN) of the telecommunications network. Data transported via such an IP-CAN bearer receives the QoS treatment associated with the IP-CAN bearer. The data sessions A2, B2 between the terminals 3A, 3B and the server 2 are supported by the IP-CAN bearers A1, B1 in the telecommunications network and further supported via network 4.

To ensure that the bearers A1 and B1 get the appropriate QoS characteristics, at bearer establishment the PCEF* consults the PCRF* via interface Gx*. The PCRF* in its turn consults the SPR* via interface Sp* on relevant subscription information. The PCRF* takes a policy decision and informs the PCEF* via interface Gx*. The PCEF* enforces these decisions.

As mentioned above, the group information for terminals 3A, 3B according to an aspect of the invention can be used to advantage for more efficient congestion control by the telecommunications network 1.

Figure 6A:
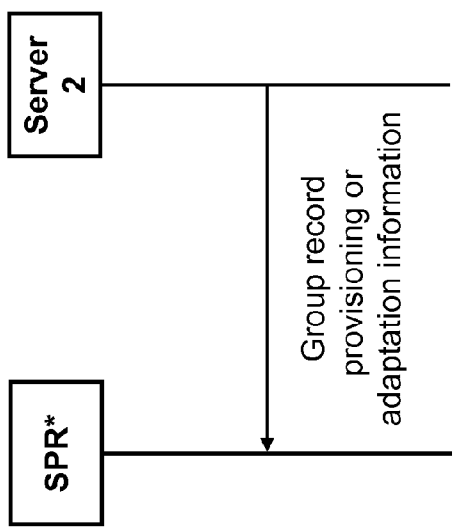
FIGS. 6A and 6B depict signal flow charts showing embodiment of provisioning of a telecommunications node by the server.
Figure 6B:
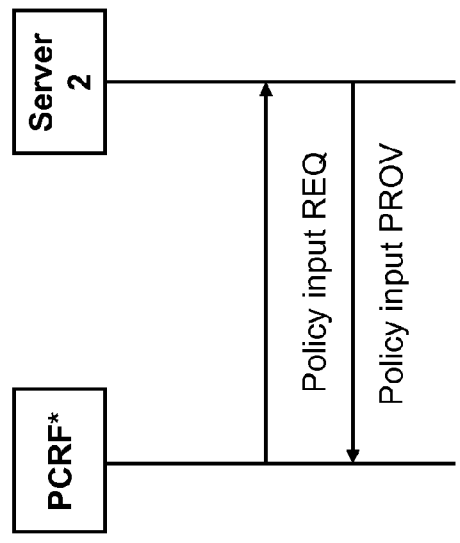

In an aspect of the invention, the provisioning interfaces Px and/or Py are defined allowing communication between the server 2 and the SPR* and/or the PCRF* as will be described further below with reference to FIGS. 6A and 6B.

A group record, as illustrated in FIG. 3B, applies to multiple communication terminals 3A, 3B that have a data session A2-B2 with the server 2 supported by bearers A1-B1, respectively. Group records are contained in the SPR*. The group information in the group record contains, for example, a bit rate threshold value that relates to the aggregate bit rate over all bearers A1, B1 of the terminals 3A, 3B in the group G. The sum of the maximum bit rate values of all individual subscriptions of the terminals 3A, 3B or of all bearers A1, B1 of the terminals 3A, 3B in the group G may be greater than the bit rate threshold value specified for the group G to profit from the statistical effect that it is highly unlikely that all communication terminals 3 in the group G will simultaneously exchange data with server 2 at the maximum bit rate specified in the individual subscription records.

The group record, as illustrated in FIG. 3B, may contain a group identifier, an identification of individual subscription IDs (e.g. IMSIs) of the terminals or bearers in the group and information related to the group such as the above-mentioned aggregate bit rate threshold for the group G.

The group record may also result in adding an identification of the group identification in the individual subscriptions that fall within the group. An individual subscription can be contained in multiple group subscriptions.

The policy decisions taken by PCRF* per individual communication terminal 3A, 3B are communicated via interface Gx* to a PCEF*. PCEF* enforces these decisions.

When a group load condition is satisfied, for example when the above-mentioned aggregate bit rate threshold specified in the group information for the group G is exceeded, the PCRF* is notified by the PCEF* and the PCRF* adjusts the individual policy decisions resulting in the modification of at least one of the bearers of the active terminals 3A, 3B in the group G. The PCRF* provides the PCEF* via interface Gx* with adjusted individual policy decisions. This may e.g. result in a downscaling of the maximum bit rate specified for bearers A1 and/or B1 and a decrease of the user data bit rate that is exchanged in the data sessions A2 and/or B2 between terminals 3A, 3B and the server 2.

It should be noted that the detection of satisfying a group load condition and reporting the event to PCRF* may also be performed by other entities than the PCEF*, including entities at locations different from the PCEF* location (e.g. in SGSN/S-GW or at the interface connecting a GGSN/P-GW to SGSN/S-GW), as will be described further with reference to FIG. 8.

In addition to the PCEF* just notifying the PCRF* about a congestion load condition being satisfied, it may include additional information with the congestion load condition fulfilled notification. The PCRF* may also request the PCEF* to monitor and report additional information. An example of additional information which may be monitored and reported by the PCEF* is a list of identifiers identifying one or more of the bearers (or data sessions or terminals) over which in the recent past data has been exchanged. The additional data may aid the PCRF* in making adjustments to its policy decisions and also to prioritise the bearers (or data sessions or terminals) to which the adjusted PCC rules should apply first, thus aiming at a more direct effect on resolving the congestion.

FIGS. 5A and 5B illustrate examples of an individual PCC rule and a group rule. Though the group rule differs from a common PCC rule, both are referred to as PCC rule in this description. The PCEF* receives those PCC rules from the PCRF* to enforce or implement them. As illustrated, the individual PCC rules contain information identifying the individual PCC rule, information used by the PCEF* to detect the related IP flow and information on the required QoS and Charging treatment, including for example the enforcement of a maximum bit rate for downlink and uplink, a guaranteed bit rate for downlink and uplink, an IP DiffServ DSCP marking and other congestion related information.

A group rule (FIG. 5B) similarly contains information identifying the group rule, information used by the PCEF* to detect the IP flow for the group (which may be aggregated from the individual flow detection information specified in the individual PCC rules for the bearers in the group) and in particular the group load condition.

In an alternative embodiment (indicated by the dashed line in FIG. 5B, a group rule may contain the PCC rule IDs for the terminals/bearers in the group, which information may serve to specify the flow detection for the terminals/bearers in the group.

As already mentioned in the summary of the invention, the disclosed method and system provide flexibility for the owner/operator of the server 2. Interaction between the server 2 and the SPR* over the Px provisioning interface, as illustrated in FIG. 6A, may e.g. result in the creation of a group record, the adaptation of this record, the adjustment of congestion threshold parameters for the individual terminals 3, the adjustment of other information in the group record, such as how to adjust the active bearers in the group once a group load condition is satisfied (see group record of FIG. 3B), etc. As illustrated in FIG. 6B, the PCRF* may also interact with the server 2 via a policy input request to retrieve information via a policy input provisioning message on how to adjust the active bearers in the group. Alternatively, the server may push this information to the PCRF*. The information may, of course, also be retrieved from the SPR* over the interface Sp*. Further, using e.g. the Px interface, further information on subgroups within a group and/or information regarding how (e.g. to which level(s)) and/or in which sequence to adjust the individual congestion related parameters can be contained in the group record and/or the individual subscription record.

Figure 7A:
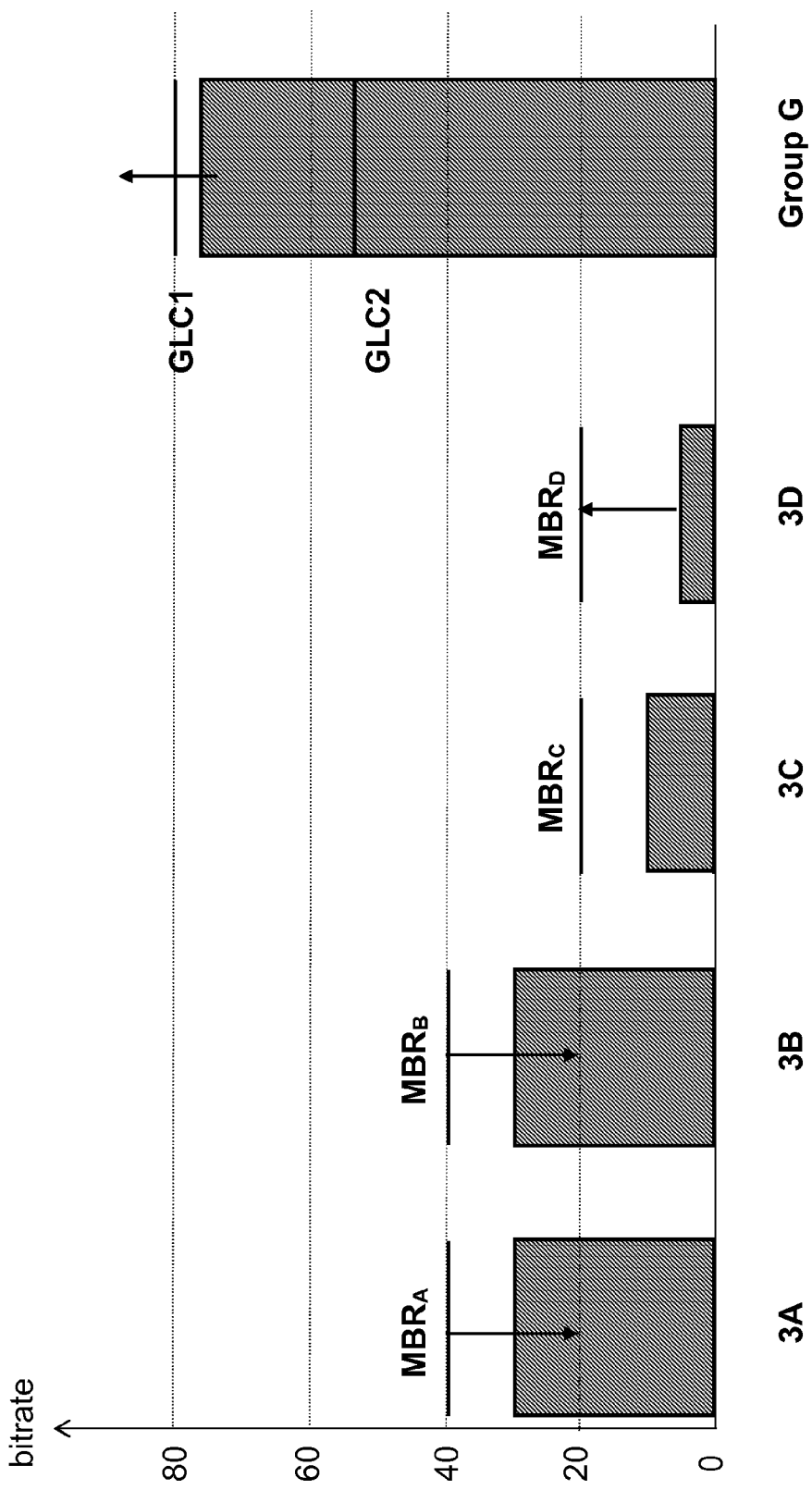
FIGS. 7A-7C depict schematic diagrams illustrating bit rate usage together with bit rate usage limits and a signal flow chart illustrating a method for congestion control according to an embodiment of the invention.
Figure 7B:
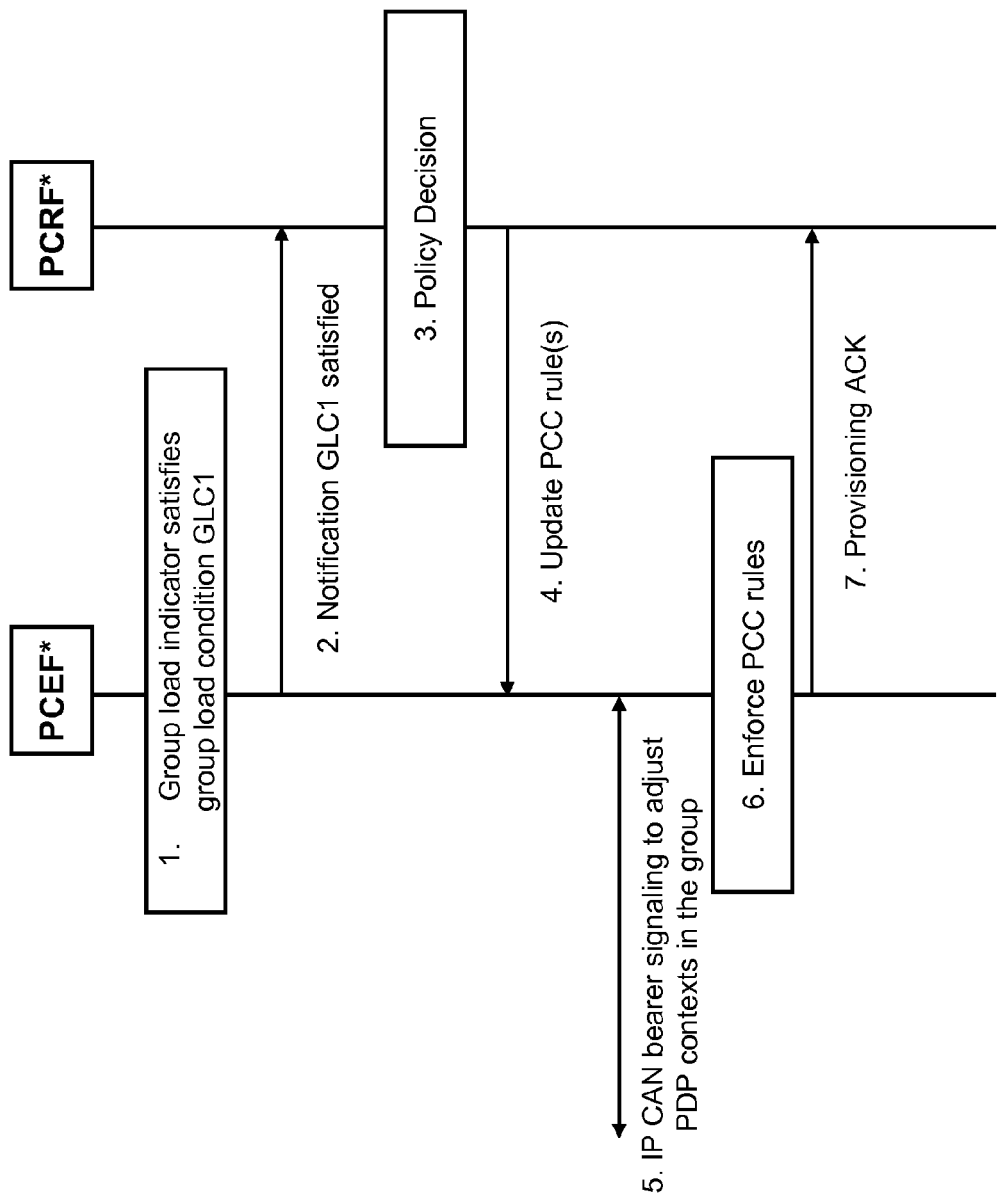

FIGS. 7A and 7B provide a first example of a method of controlling congestion in the telecommunications network 1 using the PCC* architecture of FIG. 4.

FIG. 7A shows an example of the usage of active terminals 3A-3D that triggers an interaction from the PCEF* with the PCRF*. Terminals 3A-3D have been assigned a common group identifier and thus belong to the same group G. The individual congestion parameters, here the subscribed maximum bit rate MBR, is 40 for terminals 3A, 3B and 20 for terminals 3C and 3D. All terminals 3A-3D have bearers established enabling active data sessions in the GPRS network 1 of FIG. 1. The group load condition GLC1 is defined as that congestion should be notified when the aggregate bit rate monitored for the group exceeds a value of 80. The PCEF* has accordingly been instructed by the PCRF* and monitors a group load indicator, e.g. the aggregate bit rate for the group G. As an example, assume that the actually used bit rate of terminals 3A, 3B is only 30, terminal 3C only 10 and terminal 3D only 5, as indicated by the hatched bars. Then, PCEF* may monitor a group load indicator with a value of 75, which does not satisfy the group load condition. In an alternative implementation, PCEF* may detect the group load condition in a more direct way, without explicitly determining a value for the aggregate bit rate for the group, e.g. by comparing the aggregate bit rate for the group with a reference rate such as in a token bucket or similar set to a bit rate of 80. In yet an alternative implementation, PCEF* may monitor the bit rate for each communication terminal 3 separately, for example as part of existing PCC rules, and sum the values related to each of the terminals in the group G to yield a group load indicator for group G.

When the PCEF* monitors that the group load congestion GLC1 is satisfied (resulting e.g. from an increase in the bit rate of terminal 3D from 5 to 20 (illustrated in FIG. 7A by an upwardly pointing arrow for terminal 3D), the fulfillment of the group load condition GLC1 triggers the PCEF* to notify this condition to the PCRF*. The PCEF* may, optionally, provide additional information regarding the severity of the situation, allowing the PCRF* to take this into account.

The PCRF* adjusts the individual PCC rule for at least one of the communication terminals in group G. An adjustment may relate, for example, to downscaling the maximum bit rate. In FIG. 7A the values for the maximum bit rate (MBR) of the communication terminals 3A-3D are illustrated as $MBR_A$-$MBR_D$. In this example, the PCRF* decides to downscale the maximum bit rate parameter for communication terminals 3A and 3B, i.e. the value of $MBR_A$ and $MBR_B$, from 40 to 20. The PCEF*, after receiving updated PCC rule(s) from the PCRF*, adjusts the individual congestion parameters of the $MBR_A$-$MBR_D$ of the bearers (in this example, only $MBR_A$ and $MBR_B$ need to be adjusted) as shown by the downwardly pointing arrows for $MBR_A$ and $MBR_B$. The related terminals 3A and 3B will reduce their bit rate to 20 or less. In case a terminal would fail to comply to the adjusted data session communication parameter, such as MBR, this will be enforced by PCEF* in the usual way. In this example, the individual congestion parameters (MBR) are now all set to a value 20. The telecommunications network 1 will now not deliver a bit rate of more than 80 and group load condition GLC1 is no longer satisfied.

A downward adjustment of an individual congestion parameter value may, for example, be performed to a predetermined lower value, or by subtracting a predetermined value from the current parameter value or may be performed by taking a fraction (e.g. 70%) of the current parameter value. The downward adjustment of the parameter value may thus be different within a group.

The PCEF* may notify the PCRF* when the aggregate bit rate returns within the limits again. The PCRF* may also instruct PCEF* to apply a predetermined hysteresis before notifying congestion condition expiration.

An upward adjustment of the individual congestion parameters, such as the maximum bit rate values MBR, may be performed stepwise, with "feedback" from the PCEF*, for example after every step. The size of the upward adjustments and their distribution amongst the IP-CAN bearers or terminals 3A-3D is decided by the PCRF*. As an example, the distribution may be predefined in the group record stored in the SPR*, or the PCRF* may consult the server 2 via provisioning interface Py as illustrated in FIG. 6B or an upward adjustment may be requested by a communication terminal and then subject to approval from the PCRF* in the usual way.

It should be appreciated that the adjustment of the individual congestion parameters, either a downward adjustment of an upward adjustment, may be performed according to various policies as exemplified above. The congestion parameter adjustment policies for a group may be comprised in a group record, as schematically indicated in FIG. 3B.

As illustrated in FIG. 7A, a second group load condition GLC2 may be defined that functions as a lower trigger level for triggering the PCEF* to notify the PCRF*. When group load condition GLC2 is no longer satisfied, the PCRF* may decide on scaling up one or more of its previously set PCC rules for terminals 3A-3D in the group G that could benefit from a somewhat higher bit rate.

FIG. 7B provides a schematic flow chart of the communication between the PCEF* and the PCRF* in the above-described example for uplink traffic.

In step 1, PCEF* establishes that group load condition GLC1 or GLC2 is satisfied. In the present example, the PCEF* detects that the aggregate bit rate of the communication terminals 3 in group G exceeds a predetermined value at a particular point in time.

In step 2, the PCEF* notifies the PCRF* on the fact that the group load condition GLC1 is satisfied.

In step 3, a new policy decision is made by the PCRF*, for example a decision to scale down the maximum bit rate parameters (MBR) for the PCC rules and, consequently, for the bearers of terminals 3A and 3B of the group G. The information which bearers and/or which parameters should be adapted is determined by the congestion parameter adjustment policy or is e.g. obtained from the SPR* or from the server 2 as illustrated in FIG. 6A as described above.

In step 4, the PCEF* is informed of the adjusted individual PCC rules, illustrated in FIG. 5A, for terminals 3A and 3B. Updated group rules may also be provided to the PCEF* when the operator of the telecommunications network 1 may e.g. desire to adapt the group load condition GLC1 and/or GLC2.

In step 5, the IP-CAN bearers of the relevant communication terminals (in this example: for terminal 3A and for terminal 3B) are modified according to the adjusted PCC rule for that communication terminal. Each of the involved terminals (in this example: terminals 3A and 3B) is informed about the adjusted value of the individual congestion parameters (in this example with a downscaled value of the MBR) and the terminal will act accordingly.

While these messages may be sent to each of the terminals (in this example: terminals 3A and 3B) separately from the gateway GGSN, it may be advantageous to use the group identifier of the group G and send a group update request to a network node further downstream in the telecommunications network 1 in order to adjust the data session communication parameters (e.g. PDP Context and IP-CAN bearer) of the communication terminals in the group G. This will explained in further detail below with reference to FIG. 8 ff.

In step 6, the PCEF* enforces the new individual PCC rules, using the adjusted PCC rules for (in this example) terminals 3A and 3B.

Finally, in step 7, the PCEF* informs the PCRF* on the successful adjustment of the IP-CAN bearers and, possibly, about the establishment of an adjusted group load condition.

Of course, the process may be repeated from step 1 for additional notifications related to a same (possibly adjusted) group load condition or other such conditions and/or may be repeated from step 3, for example to further downwardly adjust individual congestion parameters when an earlier downward adjustment has not yet sufficiently resolved the congestion or to instruct an upward adjustment when PCRF* decides so.

Figure 7C:
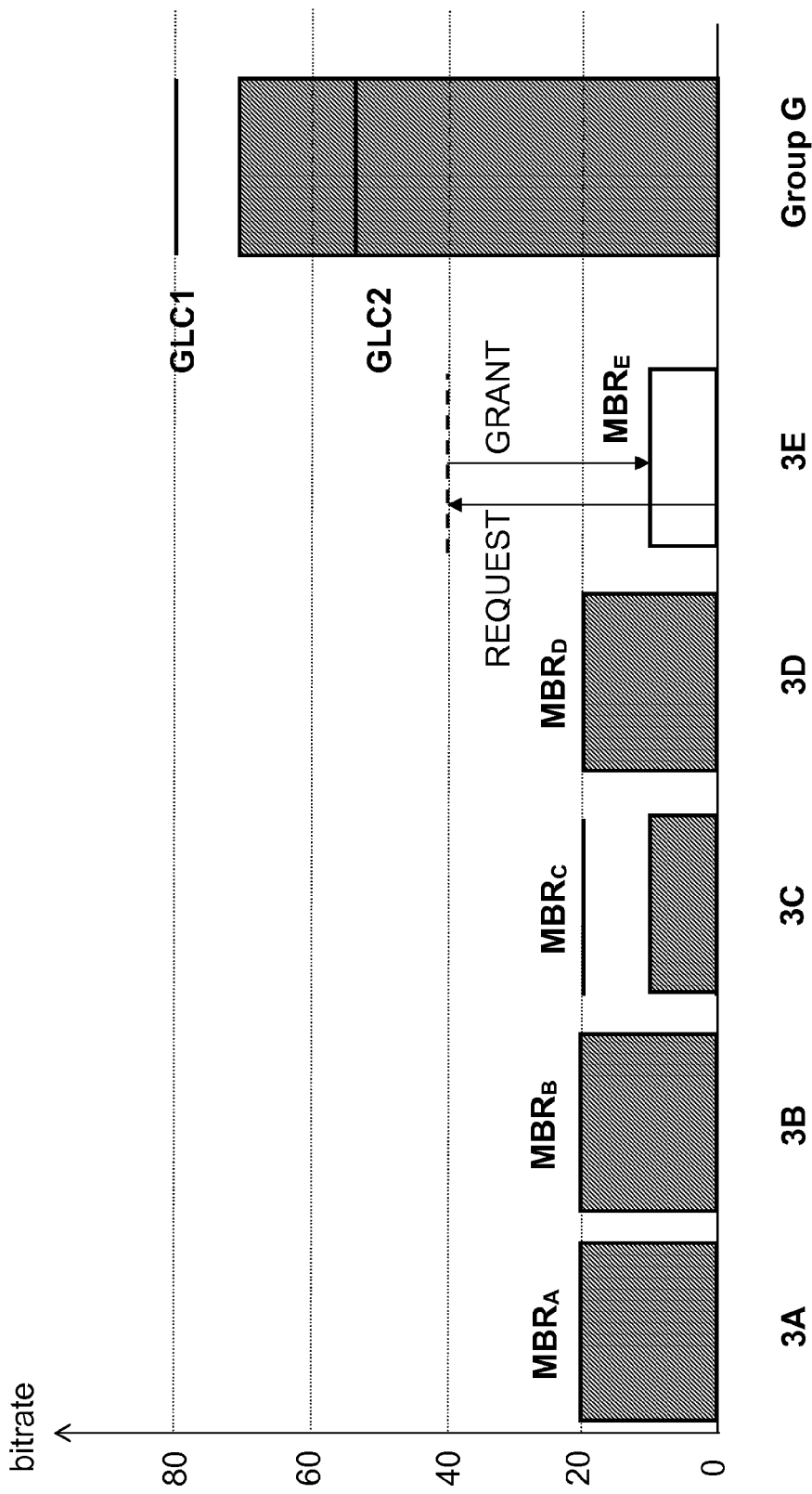

When the PCRF* is notified about a congestion condition, the PCRF* may, in addition to adjusting a congestion parameter of the bearer(s), also decide to make adjustments to its policy to authorise QoS resources to additional bearers which may be requested to be established or to additional data sessions which may request to become active in the group. This is illustrated in FIG. 7C for terminal 3E. For example, the PCRF* may decide to also adjust the maximum bit rate that may be authorised to additional bearers or sessions in group G from a value of e.g. 40 to a value of e.g. 10. When the additional terminal 3E in group G were to request to establish a bearer with an $MBR_E$ of e.g. 40, the PCRF* will take a policy decision. In this case, the PCRF* will not grant the requested $MBR_E$ of 40, which would otherwise be allowed, but it will issue a PCC rule with an $MBR_E$ of 10, shown by the downwardly pointing arrow for terminal 3E.

As mentioned above, the availability of a group record and the common group identifier can be used to advantage both in combination with the congestion control method and system as described above and for other purposes as described in the co-pending application "Information transmission in a machine-to-machine telecommunications network" of the applicant filed on the same date, which is included in the present application by reference in its entirety.

Generally, the common group identifier can be used to adjust the IP-CAN bearers, such as a PDP Context or a parameter of the IP-CAN, of a large number of communication terminals. Currently, a network-initiated modification of a particular PDP Context is supported by most modern telecommunications network technologies. The current techniques involve signaling between at least a network node and each of the communication terminals.

In the known method, modification of the PDP context of the bearers of each of the involved communication terminals induces a signaling load proportional to the number of IP-CAN bearers (normally, the number of terminals). In other words, IP-CAN bearer modification messages take place on a per-bearer basis. PDP context modification procedures are e.g. described in 3GPP TS 23.060. In addition, the load inherently peaks when a modification is initiated for a considerable number of communication terminals, as may e.g. be necessary in the above-mentioned method and system for congestion control wherein the communication terminals 3 of the group G need to be informed on the adjustment of the PCC rules for uplink traffic. This peak is also observed for the processing load of the involved network elements.

The common group identifier of communication terminals may be used to reduce the signaling load in the network when initiating adjustment of individual congestion parameters for the bearers of a considerable number of communication terminals. Also, the peak in signaling load and the processing load in the network elements can be reduced in this manner.

As an example, an IP-CAN bearer group modification procedure can be used that comprises the IP-CAN bearer modifications of the individual communication terminals 3. (Sub) groups are identified by common (sub)group identifiers in a HLR or HSS/SPR and communication terminals can be assigned to one or more of these groups.

Such a group modification procedure can e.g. be initiated in a network node as the GGSN/P-GW or the SGSN/S-GW upon detection of a trigger for such modification (see the earlier embodiment of satisfying the congestion load condition).

Figure 8:
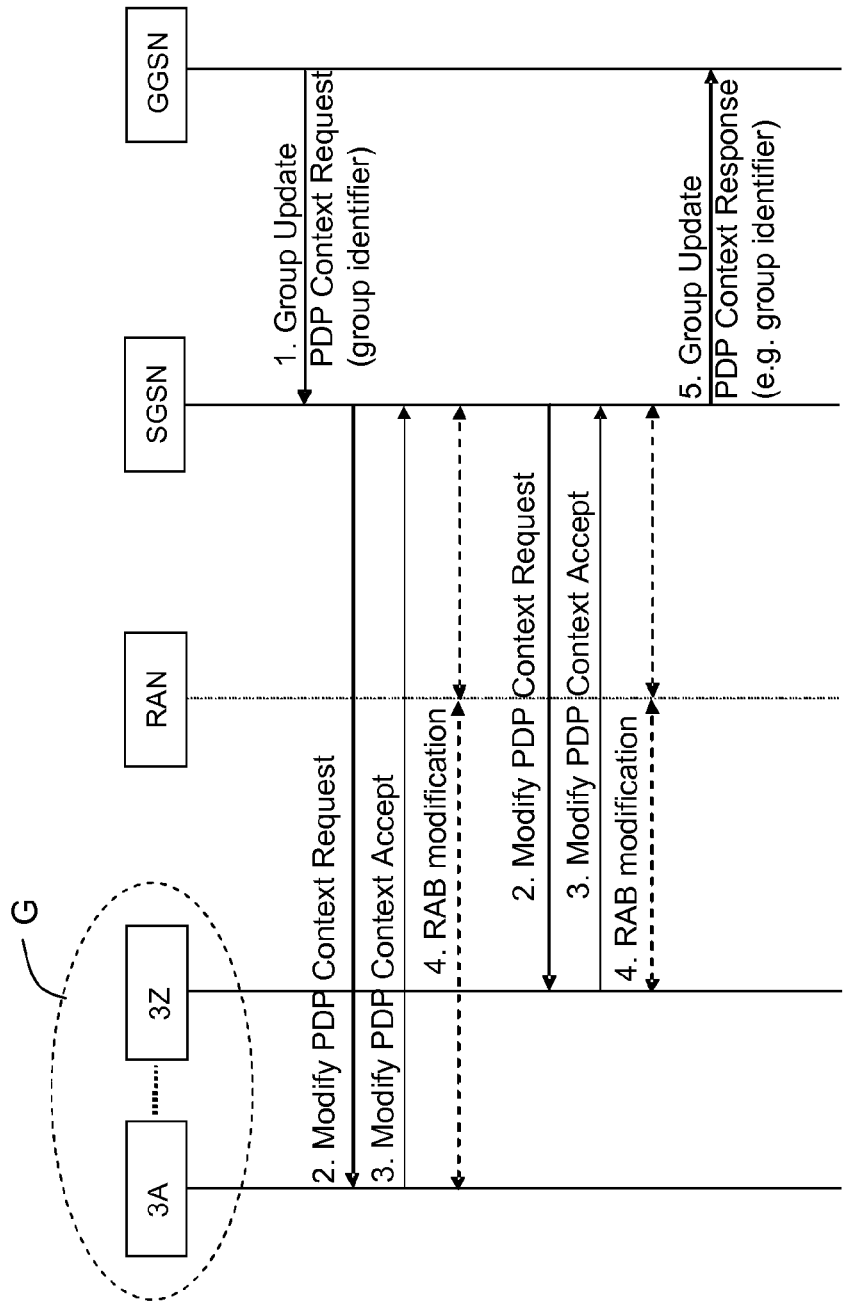
FIG. 8 depicts a signal flow chart showing an embodiment of a GGSN-initiated group PDP context modification procedure.

FIG. 8 is an embodiment of a GGSN-initiated group PDP context modification procedure for a group G comprising communication terminals 3A-3Z.

In the first step after a trigger (not shown), the GGSN sends a Group Update PDP Context Request to one or more SGSNs. This message contains e.g. a common group identifier as obtained from the group record stored in the HLR/SPR* or HSS/SPR*. The message also contains the QoS Requested parameter indicating the desired QoS profile for each of the bearers in the group G. Considerable efficiency is gained here, since only one request is transmitted from the GGSN to the SGSN as opposed to the prior art procedure wherein update requests are required for each bearer individually. The Group Update PDP Context Request may contain the IP-CAN bearer adjustment for the above-described congestion control method and telecommunications network 1.

The SGSN derives the involved communication terminals 3A-3Z from the Group Update PDP Context Request received from the GGSN by interacting with the HLR using the common group identifier. The information on the individual communication terminals 3A-3Z (i.e. the individual identifiers thereof) may be retrieved from the HLR and/or stored at the SGSN after retrieval.

The SGSN sends in step 2 a Modify PDP Context Request message to each terminal 3A-3Z comprising, amongst other information, the newly negotiated QoS. The newly negotiated QoS may have been restricted further by the SGSN.

Each terminal 3A-3Z may acknowledge the PDP Context Modification Request of step 2 by returning to the SGSN a Modify PDP Context Accept message. If a terminal 3A-3Z does not accept the newly negotiated QoS, it may instead de-activate the PDP context with a terminal-initiated PDP Context Deactivation procedure. The SGSN may then follow a terminal-initiated PDP Context Deactivation procedure (not shown).

At least in UMTS networks, a PDP Context modification also involves a RAB (Radio Access Bearer) modification. RAB modifications are performed immediately after a Modify PDP Context Request (step 2) or after a Modify PDP Context Accept (step 3) in step 4 for each individual communication terminal 3A-3Z. Alternatively, the RAB modification is performed after receiving the Modify PDP Context Accept of step 3 for each of the terminals.

Upon receipt of the Modify PDP Context Accept messages from all terminals 3A-3Z, or upon completion of all the RAB modification procedures (for UMTS networks), the SGSN returns a Group Update PDP Context Response message to the GGSN. This message contains e.g. the same common group identifier as contained in the Group Update PDP Context request received from the GGSN. In signaling message exchange it is also possible to use a transaction identifier, which value is assigned by the GGSN and the GGSN includes in the request of step 1 and which value the SGSN includes in its response in step 5, possibly as an alternative for the group identifier.

A group PDP Context modification as shown in FIG. 8 may also be initiated by an SGSN, for example, when the SGSN or an associated entity detects a congestion load condition as described earlier. In such a situation, the SGSN may advantageously immediately initiate a group PDP Context Modification, rather then only reporting the congestion condition to another network node (to e.g. the GGSN or to the PCEF*) and having other network entities initiating appropriate action. In this case it is assumed that a group has been defined wherein all data sessions (communication terminals) belonging to the group are under control of the SGSN. Then, a similar procedure can be followed as described for FIG. 8, where the interactions with the GGSN in the first and the last step of FIG. 8 are omitted. However, during or after completion of the modification, the SGSN notifies the GGSN about the modification, for which notification the common group identifier for that SGSN-oriented group may advantageously be used. Also, the SGSN may send a Group Update PDP Context Request to the GGSN and the GGSN may respond with a related response message to the SGSN in order to take information (e.g. limitations) available at the GGSN into account.

It should be appreciated that the procedure for group PDP Context modification as described with reference to FIG. 8 is not limited to modifications relating to congestion control and is not limited to modification of individual congestion parameters that may effect congestion resolution or relief. The procedure may also be used advantageously at other occasions where multiple PDP Contexts or similar contexts in other types of networks are to be modified and the procedure may also be used for other parameters, such as modification of the Access Point Name (APN), modification of the QoS class, modification of the DiffServ DSCP marking to be applied, etc.

It may be useful in particular cases to broadcast messages to a group of communication terminals. These messages contain the common group identifier and may e.g. contain information relating to congestion control or to other information relevant for a group G of communication terminals 3. In such cases, the communication terminals 3 should have (access to) the common group identifier in order to retrieve (select) the information from the broadcast. This information relating to the common group identifier may e.g. be obtained during an attach procedure to the telecommunications network 1, wherein the common group identifier(s) can be retrieved from the individual subscription record (see FIG. 3A) and transmitted to the terminal. The common group identifier(s) may also be stored or preprogrammed in (a module of) the communication terminal 3.

Figure 9:
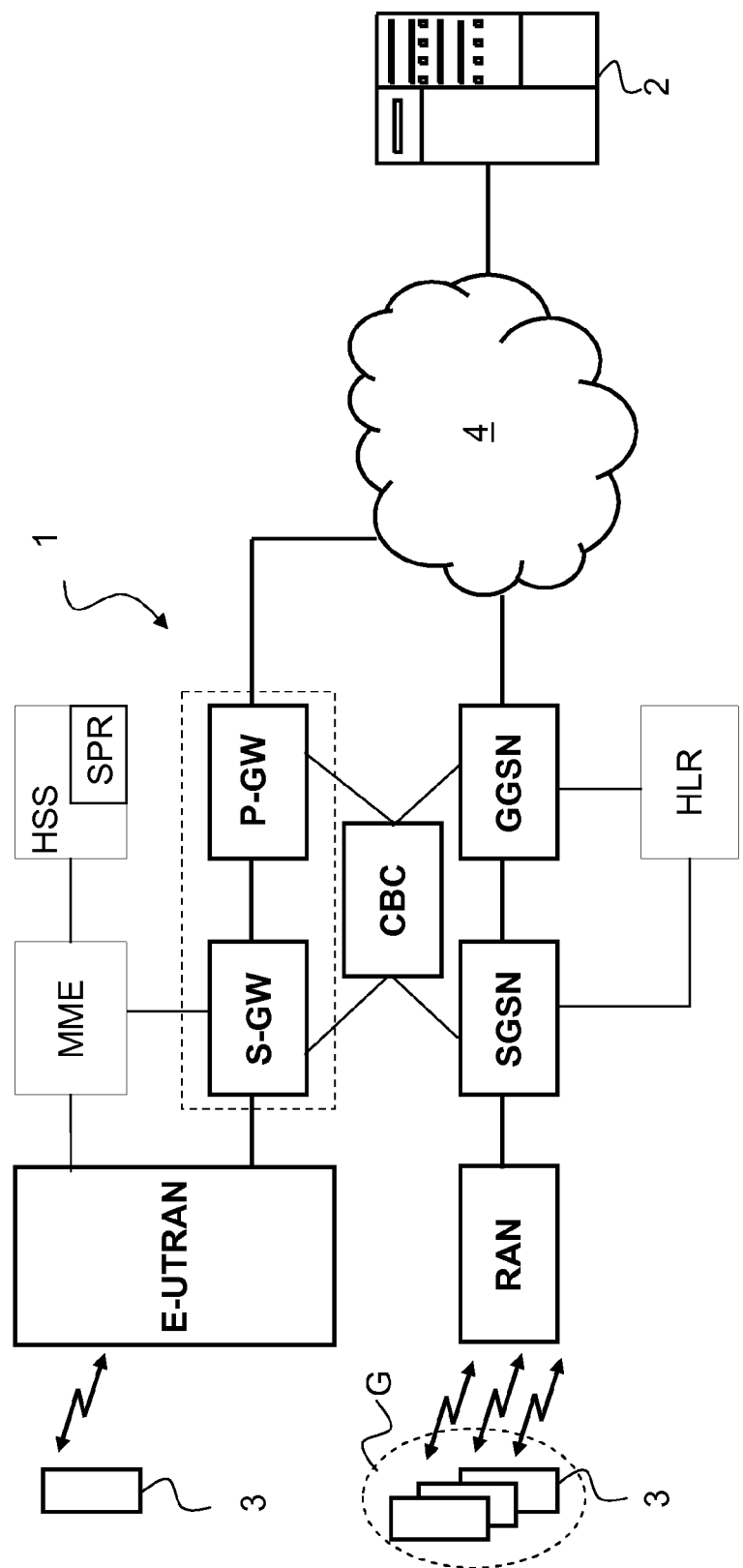
FIG. 9 depicts a schematic illustration of a telecommunications network including a cell broadcast centre.

The broadcast embodiments may apply a cell broadcast centre CBC, known as such. Various architectures are possible, e.g. where the CBC is connected to a plurality of SGSNs/S-GWs and/or to a plurality of GGSNs/PG-W, as displayed in FIG. 9. Again, the message transmission may be initiated either by a SGSN or by a GGSN. Cell broadcast services are specified in 3GPP TS 23.041.

Figure 10:
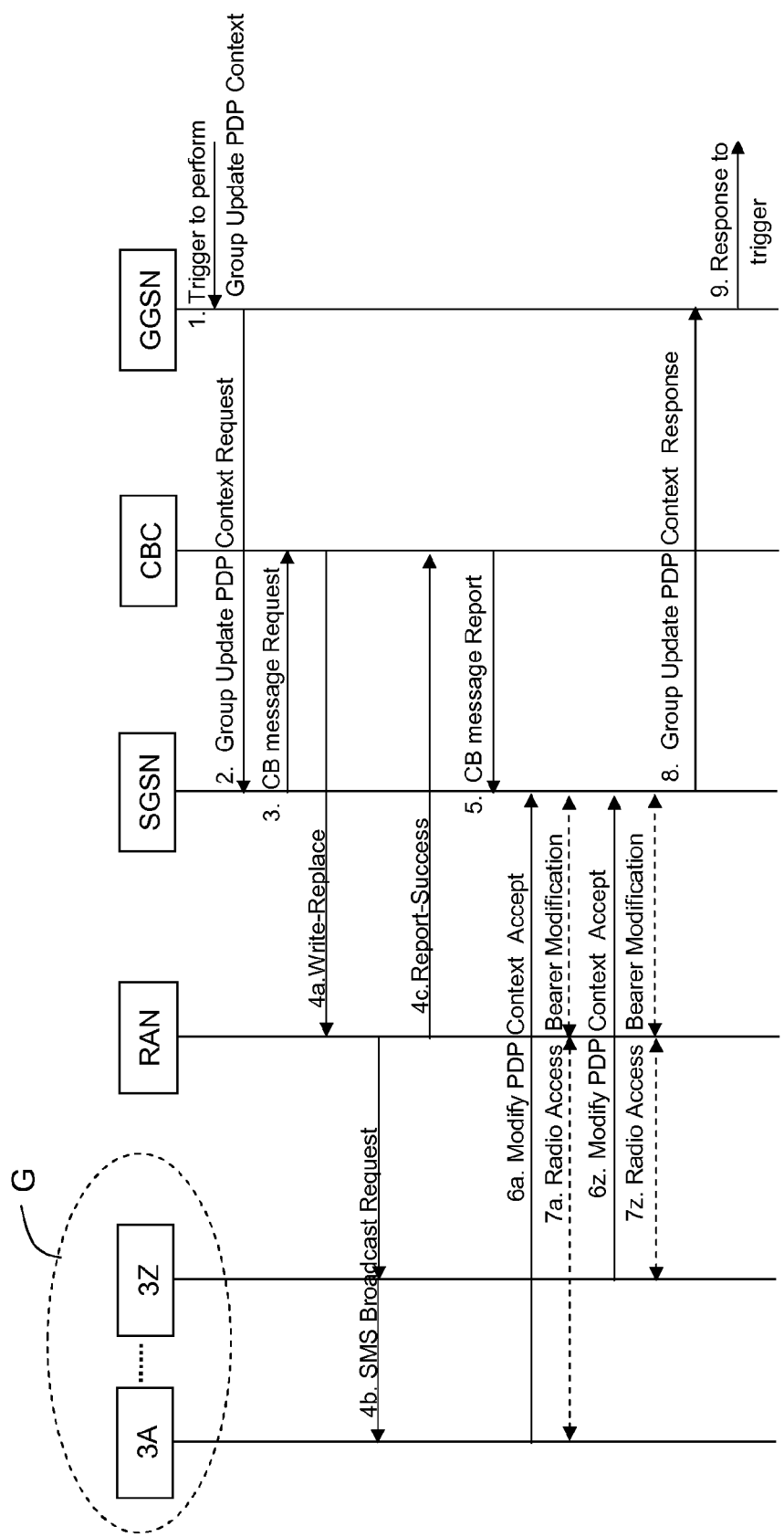
FIG. 10 depicts a signal flow chart showing an embodiment of a GGSN-initiated group PDP context modification procedure using cell broadcast technology.

FIG. 10 shows a flow chart for modifying the PDP Context of a group G of terminals 3A-3Z, wherein the GGSN initiates the group update PDP context request, when triggered (step 1) to modify the PDP context as described previously and the CBC is controlled by the SGSN.

The GGSN sends in step 2 a Group Update PDP Context Request to one or more SGSNs. This request contains at least the common group identifier for the group G of communication terminals 3A-3Z that has to be modified and (a) parameter(s) indicating the desired QoS for the bearers of the communication terminals 3A-3Z in the group G. In order to ensure that all relevant SGSNs receive this request the GGSN may follow different approaches. One approach is that the GGSN sends the request to all SGSNs it connects to. Another approach is that the GGSN derives the relevant SGSNs (by consulting the HLR/HSS) and sends the request to the relevant SGSNs only. Yet another approach is that the GGSN, for each group, sets up a multicast group on which messages may be multi-casted. Then, the SGSN, when a PDP Context is set up for a terminal belonging to a certain group G, informs the GGSN that it subscribes to receiving all messages transmitted on the multicast group associated with group G. In the event of a group Update PDP Request, the GGSN only needs to insert a single message on the multicast group associated with group G to ensure that all relevant SGSNs (which all are subscribed to that group) receive the message.

The SGSN uses a broadcast or multicast technology to inform the communication terminals 3A-3Z in the group G on the update PDP context group request. More specifically, in this embodiment, Cell Broadcast (CB) is used. The SGSN acts a Cell Broadcast Entity (CBE) (see 3GPP TS 23.041). It defines the geographical areas, known as cell broadcast areas, in which the messages should be broadcasted. This could be all cells that are associated with the SGSN. In step 3, the SGSN sends a CB message Request to the CBC. This CB message contains the Modify PDP Context Group Request parameter, the common group identifier for the group G and (a) parameter(s) indicating the requested QoS for the PDP contexts in the group G.

In step 4a, the CBC transfers the CB message in Write-Replace messages to the RAN i.e. to one or more BSCs/RNCs according to the (defined) cell broadcast area. In turn the RAN, via an SMS Broadcast Request, requests to broadcast the CB message in the defined areas in step 4b. The CB message contains also the common group identifier for group G. Each communication terminal receiving the broadcast message is then able to determine whether or not the received message is destined for that terminal. That is the case when at least one of the group identifiers in a received message matches at least one of the terminal's group identifiers. A communication terminal with a group identifier $ID_G$ for group G, will thus recognise that a received broadcast message that comprises group identifier $ID_G$ is destined for that terminal as shown in step 4b of FIG. 10 and other terminals which received this message may ignore this message as irrelevant (not shown in FIG. 10). Alternatively, when multiple cell broadcast channels are available, the group identifier may determine to which of the channels the communication terminals should be tuned. In response to the Write-Replace the RAN sends a Report-Success, in step 4c. The broadcast of messages in this step 4 is according to the specification of Cell Broadcast Services, refer to 3GPP TS 23.041.

After having received all the Report-Success messages from the RAN i.e. from all the involved BSCs/RNCs, the CBC sends a CB message Report to the SGSN in step 5. Also, the communication terminals 3A-3Z, having received the CB message and having recognised the message as destined for it, in step 4b accept the modification requests in steps 6a-6z. Each of them sends an ordinary Modify PDP Accept message (eventually including an identification of the group G of the communication terminals 3A-3Z to which the PDP context belongs) to the SGSN. As indicated before, it is also common to use a transaction identifier, which value could be assigned by the SGSN and the SGSN includes it in the group Modify PDP Context request in the CB message request of step 3 and which value each of the terminals 3A-3Z includes in its response in step 6a-z.

In steps 7a-7z, Radio Access Bearer (RAB) modification is performed for each of the terminals 3A-3Z individually after receiving the Modify PDP Context Accept messages 6a-6z for an individual terminal. Again, these steps 7a-7z may also be performed after receiving all individual Modify PDP Context Accept messages (steps 6a-6z).

Upon handling of the Modify PDP Context procedures from all communication terminals 3A-3Z in the group G, the SGSN returns a Group Update PDP Context Response message to the GGSN in step 8. This message contains at least the common group identifier for the group G. As indicated before, it is also common to use a transaction identifier, which value is assigned by the GGSN and the GGSN includes in the group Update PDP Context Request of step 2 and which value the SGSN includes in its response in step 8.

Finally, the GGSN may inform the entity that triggered the group-wise modification of the PDP contexts on the outcome of the PDP context modification (step 9).

As already noted, other variants of the embodiment of FIG. 10 are possible. As an example, the GGSN may be triggering the CBC to send the modification requests to the communication terminals 3A-3Z in the group G. The cell broadcast interaction will then be between the GGSN and the CBC instead of between the SGSN and the CBC. Step 2 will then be an information message from the GGSN to the SGSN also including the notification that the GGSN will act as a Cell Broadcast Entity (CBE).

In another envisaged embodiment, the SGSN (instead of the GGSN) will be triggered to initiate the modification for the group G of communication terminals 3A-3Z. The SGSN may then send a Group Update PDP Context Request to the GGSN and the GGSN may return a Group Update PDP Context Response message to the SGSN.

In still another embodiment, the SGSN is triggered to initiate the modification of the group G of communication terminals 3A-3Z (like in the previous embodiment), but the GGSN will act as the CBE. The SGSN, internally triggered, sends a Group Update PDP Context Request to the GGSN. The GGSN returns a Group Update PDP Context Response Message to the SGSN. The Cell Broadcast interaction occurs between the GGSN and the CBC and the GGSN informs the SGSN that it will act as the CBE.

The invention claimed is:

1. A method for congestion control in a telecommunications network, the telecommunications network supporting one or more active data sessions between a server and at least a first and second communication terminal by providing at least a first and a second bearer, respectively, the method comprising the steps of:
storing a common group identifier assigned to a group comprising the at least the first and second communication terminal;
storing a first individual bit rate for the first bearer and a second individual bit rate for the second bearer of the first and second communication terminals, respectively, wherein the first and second individual bit rates correspond to first and second maximum bit rates allowed on the first and second bearers, respectively;
monitoring in the telecommunications network a group load indicator defined for the group of at least the first and the second terminal corresponding to the common group identifier, wherein the group load indicator corresponds to a measure of total traffic load carried on the at least first and second bearers;
comparing the group load indicator of the group with a group load condition of the group of the at least first and second communication terminals corresponding to the common group identifier; and
controlling congestion in the telecommunications network by reducing at least one of the first individual bit rate of the first bearer and the second individual bit rate of the second bearer when the group load indicator satisfies the group load condition;
wherein the group load indicator is a measured aggregate bit rate of the group, wherein the group load condition is an aggregate bit rate threshold of the group, and
wherein a case in which the group load indicator satisfies the group load condition is a case in which the measured aggregate bit rate of the group exceeds the aggregate bit rate threshold of the group.

2. The method according to claim 1, wherein the group load indicator is also defined for a third communication terminal, the method further comprising the steps of:
storing the common group identifier for the third communication terminal; storing a third individual bit rate for a third bearer of the third communication terminal;
receiving a request for establishing the third bearer in order to enable an active data session between the server and the third communication terminal;
controlling congestion in the telecommunications network by reducing also the third individual bit rate of the third bearer when the group congestion indicator satisfies the group load condition; and
granting the request for establishing the third bearer supporting one or more active data sessions between the server and the third communication terminal applying the reduced third individual bit rate for the third bearer.

3. The method according to claim 1, further comprising the steps of:
determining that the first communication terminal has exchanged data over the first bearer more recently than the second terminal has exchanged data over the second bearer; and
reducing the first individual bit rate of the first bearer before reducing the second individual bit rate of the second bearer when the group load indicator satisfies the group load condition.

4. The method according to claim 1, wherein the first and second communication terminals are identifiable by a first and second individual identifier, respectively, the method further comprising the steps of:
storing a relation between the first and second individual identifiers and the common group identifier;
receiving the first and second individual identifiers;
determining the common group identifier based on the stored relation between the first and second individual identifiers and the common group identifier; and
determining the applicable group load indicator and group load condition for the group based on the common group identifier.

5. The method according to claim 1, wherein the server is connected via a provisioning interface to a network node storing the common group identifier for the first and second communication terminals, the method comprising the step of assigning the common group identifier to the first and the second communication terminal from the server via the provisioning interface.

6. The method according to claim 1, wherein the group assigned the common group identifier and having the defined group load indicator and group load condition is one of a plurality of groups including a first group of communication terminals assigned a first common group identifier, and a second group of communication terminals assigned a second common group identifier,
wherein the first group of communication terminals has a defined first group load indicator and a first group load condition, and the second group of communication terminals has a defined second group load indicator and a second group load condition,
wherein the first group is different from the second group,
wherein the group is one of: (i) different from the first group and the second group, (ii) the same as the first group, or (iii) the same as the second group,
and wherein the method further comprises the steps of:
storing the first common group identifier for the first group of communication terminals and the second common group identifier for the second group of communication terminals, wherein the first communication terminal is assigned to both the first group and the second group;

monitoring in the telecommunications network the first group load indicator of the first group of communication terminals corresponding to the first common group identifier and the second group load indicator of the second group of communication terminals corresponding to the second common group identifier;

comparing the first group load indicator with the first group load condition of the first group of communication terminals corresponding to the first common group identifier;

comparing the second group load indicator with the second group load condition of the second group of communication terminals corresponding to the second common group identifier; and controlling congestion in the telecommunications network by adjusting the first individual bit rate of the first bearer when at least one of: (i) the first group load indicator satisfies the first group load condition or (ii) the second group load indicator satisfies the second group load condition.

7. The method according to claim 1, further comprising the step of reducing the at least one of the first and second individual bit rates gradually.

8. The method according to claim 1, wherein the step of reducing the at least one of the first and second individual bit rates of the first and second bearers, respectively, when said group load indicator satisfies the group load condition is performed for uplink traffic from the first and second communication terminals to the server and further comprises informing the first and/or second communication terminal for which the bit rates are reduced of an adjustment of the characteristics of the first respectively the second bearer for the one or more active data sessions.

9. The method according to claim 8, wherein the step of informing said first and/or second communication terminal comprises the step of including the common group identifier in an information message in said telecommunications network for informing the first and/or second communication terminal.

10. The method according to claim 9, wherein the information message containing the common group identifier is broadcast in at least a part of the telecommunications network.

11. A telecommunications network configured for enabling data sessions between a server and at least a first and a second communication terminal by providing at least a first and a second bearer, respectively, the telecommunications network comprising:
a first storage node storing a common group identifier assigned to a group comprising the at least first and second communication terminal;
a second storage node storing a first individual bit rate for the first bearer and a second individual bit rate for the second bearer of the first and second communication terminals, respectively, wherein the first and second individual bit rates correspond to first and second maximum bit rates allowed on the first and second bearers, respectively;
a monitoring module configured to monitor a group load indicator defined for the group of the at least first and second communication terminal corresponding to the common group identifier, wherein the group load indicator corresponds to a measure of total traffic load carried on the at least first and second bearers;

an analyzer configured to compare the group load indicator with a group load condition of the group of the at least first and second communication terminal corresponding to the common group identifier; and a congestion controller configured to control congestion in the telecommunications network by reducing at least one of the first individual bit rate of the first bearer and the second individual bit rate of the second bearer when the group load indicator satisfies the group load condition;

wherein the group load indicator is a measured aggregate bit rate of the group, wherein the group load condition is an aggregate bit rate threshold of the group, and wherein a case in which the group load indicator satisfies the group load condition is a case in which the measured aggregate bit rate of the group exceeds the aggregate bit rate threshold of the group.

12. The telecommunications network according to claim 11, wherein the telecommunications network is configured to transmit an information message towards the first and second user terminals, the message comprising the common group identifier and comprising information regarding adjustment of characteristics of the bearer in an uplink traffic direction of the data sessions.

13. The telecommunications network according to claim 12, wherein the telecommunications network is configured to transmit an information message towards the first and second user terminals in a broadcast message.

14. The telecommunications network according to claim 11, wherein the telecommunications network is configured to execute the method according to claim 3.

15. A non-transitory computer readable medium having stored thereon software instructions that, if executed by one or more processors of a telecommunications network, cause the telecommunications network to carry out operations, wherein the telecommunications network supports one or more active data sessions between a server and at least a first and second communication terminal by providing at least a first and a second bearer, respectively, and wherein the operations include:
storing a common group identifier assigned to a group comprising the at least the first and second communication terminal;
storing a first individual bit rate for the first bearer and a second individual bit rate for the second bearer of the first and second communication terminals, respectively, wherein the first and second individual bit rates correspond to first and second maximum bit rates allowed on the first and second bearers, respectively;
monitoring in the telecommunications network a group load indicator defined for the group of at least the first and the second terminal corresponding to the common group identifier, wherein the group load indicator corresponds to a measure of total traffic load carried on the at least first and second bearers;
comparing the group load indicator of the group with a group load condition of the group of the at least first and second communication terminals corresponding to the common group identifier; and
in response to determining that the group load indicator satisfies the group load condition, controlling congestion in the telecommunications network by reducing at least one of the first individual bit rate of the first bearer and the second individual bit rate of the second bearer;
wherein the group load indicator is a measured aggregate bit rate of the group, wherein the group load condition is an aggregate bit rate threshold of the group, and wherein a case in which the group load indicator satisfies the group load condition is a case in which the measured aggregate bit rate of the group exceeds the aggregate bit rate threshold of the group.

\* \* \* \* \*